United States Patent
Ring et al.

(10) Patent No.: US 12,354,027 B2
(45) Date of Patent: Jul. 8, 2025

(54) METHOD AND SYSTEM FOR AN INTELLIGENT ARTIFICIAL AGENT

(71) Applicants: Sony Corporation, Tokyo (JP); Sony Corporation of America, New York, NY (US)

(72) Inventors: Mark Bishop Ring, Anaheim, CA (US); Satinder Baveja, Ann Arbor, MI (US); Peter Stone, Austin, TX (US); James MacGlashan, Riverside, RI (US); Samuel Barrett, Somerville, MA (US); Roberto Capobianco, Itri (IT); Varun Kompella, Aachen (DE); Kaushik Subramanian, Richmond, CA (US); Peter Wurman, Acton, MA (US)

(73) Assignee: SONY GROUP CORPORATION, Tokyo (JP)

( * ) Notice: Subject to any disclaimer, the term of this patent is extended or adjusted under 35 U.S.C. 154(b) by 752 days.

(21) Appl. No.: 15/943,947

(22) Filed: Apr. 3, 2018

(65) Prior Publication Data
US 2019/0303776 A1    Oct. 3, 2019

(51) Int. Cl.
G06N 20/00        (2019.01)
G06N 5/043        (2023.01)

(52) U.S. Cl.
CPC .............. *G06N 5/043* (2013.01); *G06N 20/00* (2019.01)

(58) Field of Classification Search
CPC ................................ G06N 5/043; G06N 20/00
See application file for complete search history.

(56) References Cited

U.S. PATENT DOCUMENTS

| | | | |
|---|---|---|---|
| 6,366,896 B1* | 4/2002 | Hutchison | G06N 3/02 706/14 |
| 6,594,524 B2 | 7/2003 | Esteller et al. | |
| 9,997,039 B1 | 6/2018 | Heaton et al. | |
| 10,289,910 B1* | 5/2019 | Chen | G06K 9/4628 |
| 2008/0059274 A1 | 3/2008 | Holliday | |

(Continued)

OTHER PUBLICATIONS

Masakazu Hirkoawa, Coaching Robots: Online Behavior Learning from Human Subjective Feedback, I. Jordanov and L.C. Jain (Eds.): Innovations in Intelligent Machines—3, SCI 442, pp. 37-51. (Year: 2013).*

(Continued)

*Primary Examiner* — Andrew J Jung
*Assistant Examiner* — Su-Ting Chuang
(74) *Attorney, Agent, or Firm* — INNOVATION CAPITAL LAW GROUP, LLP; Vic Lin (57) ABSTRACT

A method and system for teaching an artificial intelligent agent where the agent can be placed in a state that it would like it to learn how to achieve. By giving the agent several examples, it can learn to identify what is important about these example states. Once the agent has the ability to recognize a goal configuration, it can use that information to then learn how to achieve the goal states on its own. An agent may be provided with positive and negative examples to demonstrate a goal configuration. Once the agent has learned certain goal configurations, the agent can learn policies and skills that achieve the learned goal configuration. The agent may create a collection of these policies and skills from which to select based on a particular command or state.

16 Claims, 2 Drawing Sheets

(56) References Cited

U.S. PATENT DOCUMENTS

| | | |
|---|---|---|
| 2014/0095412 A1 | 4/2014 | Agashe et al. |
| 2015/0290798 A1* | 10/2015 | Iwatake ................ B25J 13/085 700/257 |
| 2019/0012371 A1 | 1/2019 | Campbell et al. |
| 2019/0130312 A1 | 5/2019 | Xiong et al. |
| 2019/0261566 A1 | 8/2019 | Robertson et al. |
| 2019/0347621 A1 | 11/2019 | White |
| 2020/0090042 A1 | 3/2020 | Wayne et al. |
| 2020/0211106 A1 | 7/2020 | Pan et al. |
| 2021/0187733 A1 | 6/2021 | Lee et al. |

OTHER PUBLICATIONS

Patrick Grüneberg, An Approach to Subjective Computing: A Robot That Learns From Interaction With Humans, IEEE Transactions on Autonomous Mental Development, vol. 6, No. 1, Mar. 2014 (Year: 2014).*

Jens Kober, Reinforcement learning in robotics: A survey, The International Journal of Robotics Research, 32(11) 1238-1274, 2013 (Year: 2013).*

Anna Gruebler, Coaching robot behavior using continuous physiological affective feedback, 2011 11th IEEE-RAS International Conference on Humanoid Robots, Bled, Slovenia, Oct. 26-28, 2011 (Year: 2011).*

Vecerík ("Leveraging Demonstrations for Deep Reinforcement Learning on Robotics Problems with Sparse Rewards") arXiv:1707.08817v1 [cs.AI] Jul. 27, 2017 (Year: 2017).*

Katyal ("Leveraging Deep Reinforcement Learning for Reaching Robotic Tasks") Proceedings of the IEEE Conference on Computer Vision and Pattern Recognition (CVPR) Workshops, 2017, pp. 18-19 (Year: 2017).*

Grollman ("Robot Learning from Failed Demonstrations") Int J Soc Robot (2012) 4:331-342, Jun. 30, 2012 © Springer Science & Business Media BV 2012 (Year: 2012).*

Nicolescu ("Natural Methods for Robot Task Learning: Instructive Demonstrations, Generalization and Practice") AAMAS'03, Jul. 14-18, 2003, Melbourne, Australia. (Year: 2003).*

Thomaz_2008_Teachable robots: Understanding human teaching behavior to build more effective robot learners Artificial Intelligence 172 (2008) 716-737 (Year: 2008).*

Baranes_2012_Active learning of inverse models with intrinsically motivated goal exploration in robots Robotics and Autonomous Systems 61 (2013) 49-73 (Year: 2012).*

Rai ("Learning from failed demonstrations in unreliable systems") 2013 13th IEEE-RAS International Conference on Humanoid Robots (Humanoids). Oct. 15-17, 2013. Atlanta, GA (Year: 2013).*

Zeng ("Object Manipulation Learning by Imitation") arXiv:1603.00964v3 [cs.RO] Nov. 19, 2017 (Year: 2017).*

Shiarlis ("Inverse Reinforcement Learning from Failure") Proceedings of the 15th International Conference on Autonomous Agents and Multiagent Systems (AAMAS 2016) (Year: 2016).*

Kim ("Socially Adaptive Path Planning in Human Environments Using Inverse Reinforcement Learning") Int J of Soc Robotics (2016) 8:51-66 DOI 10.1007/s12369-015-0310-2 (Year: 2016).*

Hilleli ("Deep Learning of Robotic Tasks without a Simulator using Strong and Weak Human Supervision") arXiv:1612.01086v3 [cs.AI] Mar. 26, 2017 (Year: 2017).*

Luo ("Learning to select relevant perspective in a dynamic environment") 2008 IEEE International Joint Conference on Neural Networks (IEEE World Congress on Computational Intelligence) (Year: 2008).*

Willems, et al., "The Context-Tree Weighting Method: Basic Properties", IEEE Transactions on Information Theory, vol. 41, No. 3, May 1995, pp. 653-664.

Begleiter et. al., "On Prediction Using Variable Order Markov Models", 2004, Journal of Artificial Intelligence Research, 22 (2004), pp. 385-421 (Year: 2004).

Thorhallsson et. al., Visualizing the Bias Variance Tradeoff', 2017, University of British Columbia, 2017, pp. 1-9 (Year: 2017).

Wang et. al., "genCNN: A Convolutional Architecture for Word Sequence Prediction", 2015, arXiv, 2015, pp. 1-13 (Year: 2015).

Wu et. al., "A Novel Sensory Mapping Design for Bipedal Walking on a Sloped Surface", 2012, International Journal of Advanced Robotic Systems, 9 (2012), pp. 1-9 (Year: 2012).

Botvinick, Matthew Michael. "Hierarchical reinforcement learning and decision making." Current opinion in neurobiology 22.6 (2012) : 956-962.

Florensa, Carlos, et al. "Reverse curriculum generation for reinforcement learning." Conference on robot learning. PMLR, 2017.

Bellemare et. al., "Skip Context Tree Switching", 2014, Proceedings of the 31st International Conference on Machine Learning, vol. 32(2), pp. 1458-1466 (Year: 2014).

Zhong et. al., "Toward a self-organizing pre-symbolic neural model representing sensorimotor primitives", 2014, Frontiers in Behavioral Neuroscience, vol. 8, pp. 1-11 (Year: 2014).

Brandes et al., "ASAP: A Machine Learning Framework for Local Protein Properties", 2016, Database, vol. 2016, pp. 1-10 (Year: 2016).

Tjalkens et al., "Context Tree Weighting: Multi-Alphabet Sources", 1993, Proceedings of the 14th Symposium on Information Theory in the Benelux, vol. 14(1993), pp. 128-135 (Year: 1993).

Zaheer et al., "Latent LSTM Allocation: Joint Clustering and Non-Linear Dynamic Modeling of Sequence Data", 2017, Proceedings of the 34th International Conference on Machine Learning, vol. 34 (2017), pp. 3967-3976 (Year: 2017).

* cited by examiner

METHOD AND SYSTEM FOR AN INTELLIGENT ARTIFICIAL AGENT

BACKGROUND OF THE INVENTION

1. Field of the Invention

One or more embodiments of the invention relates generally to intelligent artificial agents. More particularly, the invention relates to teaching an intelligent artificial agent through goal configurations.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Intelligent control systems for artificial intelligent agents provide improved ability to control such agents. However, many currently known systems may exhibit a variety of issues, such as brittleness and poor generalization, to name two of many.

In view of the foregoing, there is need for improvements in the training of artificial intelligent agents and associated improvements in their intelligent control systems.

SUMMARY OF THE INVENTION

Embodiments of the present invention provide a method for training an artificial intelligent agent comprising defining a goal configuration for the agent; providing positive examples via an interface to the agent when the agent has achieved the goal configuration; providing negative examples via the interface to the agent when the agent fails to achieve the goal configuration; and extracting key state features to determine what features are important during receipt of positive examples to the agent.

Embodiments of the present invention further provide a method of learning to achieve a goal configuration of an artificial agent comprising defining the goal configuration for the agent; providing positive examples via an interface to the agent when the agent has achieved the goal configuration; providing negative examples via the interface to the agent when the agent fails to achieve the goal configuration; converting state features into a distance function to determine how far the agent is from the goal configuration; using the distance function an in intermediate reward for the agent; and using goal detection as a final reward.

Embodiments of the present invention also provide a non-transitory computer-readable storage medium with an executable program stored thereon, wherein the program instructs one or more processors to perform the following steps defining a goal configuration for the agent; providing positive examples via an interface to the agent when the agent has achieved the goal configuration; providing negative examples via the interface to the agent when the agent fails to achieve the goal configuration; and extracting key state features to determine what features are important during receipt of positive examples to the agent.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field programmable gate array (FPGA), an application specific integrated circuit (ASIC), an application specific instruction-set processor (ASIP), a chip, chips, a system on a chip, or a chip set; a graphics processing unit (GPU); a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Python, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code may also be distributed among a plurality of computational units wherein each unit processes a portion of the total computation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random-access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, an EEPROM or any other memory chip or cartridge, a carrier wave as described hereinafter, or any other medium from which a computer can read.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CDROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer readable media.

While a non-transitory computer-readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory or may be communicated to an external device so as to cause physical changes or actuation of the external device. A "computing platform" may comprise one or more processors.

The term "robot" or "agent" or "intelligent agent" or "artificial agent" or "artificial intelligent agent" may refer to any system controlled directly or indirectly by a computer or computing system that issues actions or commands in response to senses or observations. The term may refer without limitation to a traditional physical robot with physical sensors such as cameras, touch sensors, range sensors, and the like, or to a simulated robot that exists in a virtual simulation, or to a "bot" such as a mailbot or searchbot that exists as software in a network. It may without limitation refer to any limbed robots, walking robots, industrial robots (including but not limited to robots used for automation of assembly, painting, repair, maintenance, etc.), wheeled robots, vacuum-cleaning or lawn-mowing robots, personal assistant robots, service robots, medical or surgical robots, flying robots, driving robots, aircraft or spacecraft robots, or any other robots, vehicular or otherwise, real or simulated, operating under substantially autonomous control, including also stationary robots such as intelligent household or workplace appliances.

Many practical embodiments of the present invention provide means and methods for efficient performance of activities by an artificial intelligent agent.

In some embodiments, a "sensor" may include, without limitation, any source of information about an agent's environment, and, more particularly, how a control may be directed toward reaching an end. In a non-limiting example, sensory information may come from any source, including, without limitation, sensory devices, such as cameras, touch sensors, range sensors, temperature sensors, wavelength sensors, sound or speech sensors, proprioceptive sensors, position sensors, pressure or force sensors, velocity or acceleration or other motion sensors, etc., or from compiled, abstract, or situational information (e.g. known position of an object in a space) which may be compiled from a collection of sensory devices combined with previously held information (e.g. regarding recent positions of an object), location information, location sensors, and the like The terms "observation" or "observations" refers to any information the agent receives by any means about the agent's environment or itself. In some embodiments, that information may be sensory information or signals received through sensory devices, such as without limitation cameras, touch sensors, range sensors, temperature sensors, wavelength sensors, sound or speech sensors, position sensors, pressure or force sensors, velocity or acceleration or other motion sensors, location sensors (e.g., GPS), etc. In other embodiments that information could also include without limitation compiled, abstract, or situational information compiled from a collection of sensory devices combined with stored information. In a non-limiting example, the agent may receive as observation abstract information regarding the location or characteristics of itself or other objects. In some embodiments this information may refer to people or customers, or to their characteristics, such as purchasing habits, personal contact information, personal preferences, etc. In some embodiments, observations may be information about internal parts of the agent, such as without limitation proprioceptive information or other information regarding the agent's current or past actions, information about the agent's internal state, or information already computed or processed by the agent.

The term "action" refers to the agent's any means for controlling, affecting, or influencing the agent's environment, the agent's physical or simulated self or the agent's internal functioning which may eventually control or influence the agent's future actions, action selections, or action preferences. In many embodiments the actions may directly control a physical or simulated servo or actuator. In some embodiments the actions may be the expression of a preference or set of preferences meant ultimately to influence the agent's choices. In some embodiments, information about the agent's action(s) may include, without limitation, a probability distribution over the agent's action(s), and/or outgoing information meant to influence the agent's ultimate choice of action.

The term "state" or "state information" refers to any collection of information regarding the state of the environment or agent, which may include, without limitation, information about the agent's current and/or past observations.

The term "policy" refers to any function or mapping from any full or partial state information to any action information. Policies may be hard coded or may be modified, adapted or trained with any appropriate learning or teaching method, including, without limitation, any reinforcement-learning method or control optimization method. A policy may be an explicit mapping or may be an implicit mapping, such as without limitation one that may result from optimizing a particular measure, value, or function. A policy may include associated additional information, features, or characteristics, such as, without limitation, starting conditions (or probabilities) that reflect under what conditions the policy may begin or continue, termination conditions (or probabilities) reflecting under what conditions the policy may terminate.

The term "distance" refers specifically to the space between two points on a surface as determined by a convenient metric, such as, without limitation, Euclidean distance or Hamming distance. Two points or coordinates are "close" or "nearby" when the distance between them is small.

The term "learning update" may refer to the modification of a policy or to a policy's associated coordinate. This modification may improve the agent's performance or effectiveness. A learning update applied to a single policy may modify the policy so as to produce a better mapping from state information to action information. A single learning update applied to multiple policies may modify those policies in similar but not necessarily identical ways. In a non-limiting example, the learning update may modify all policies receiving the update by moving them in the same direction in policy space, or in another non-limiting example by moving them towards the same point in policy space or toward the same target output for a specific input or set of inputs.

Broadly, embodiments of the present invention provide methods and systems for teaching an artificial intelligent agent where the agent can be placed in a state that it would like it to learn how to achieve. By giving the agent several examples, it can learn to identify what is important about these example states. Once the agent has the ability to recognize a goal configuration, it can use that information to then learn how to achieve the goal states on its own. An agent may be provided with positive and negative examples to demonstrate a goal configuration. Once the agent has learned certain goal configurations, the agent can learn policies that achieve the learned goal configuration. The agent may create a collection of these policies and skills from which to select based on a particular command or state.

Figure 1:
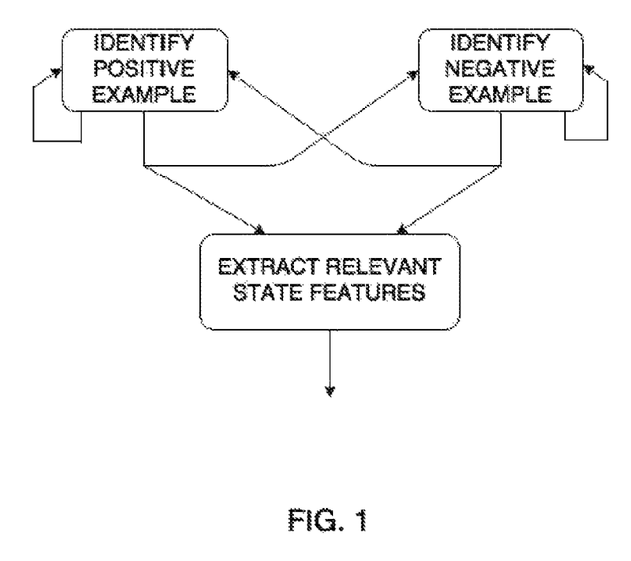
FIG. 1 illustrates an exemplary flow chart showing how positive and negative examples can be provided to an agent, along with the extraction of relevant or key state features when demonstrating goal configuration of an artificial intelligent agent.

At the outset, the agent needs to learn how to achieve goal configurations. This method, as shown in FIG. 1, can include identifying positive examples and identifying negative examples so that the agent can extract relevant state features.

For example, the agent may be an intelligent robot pet where a user desires to train the robot pet to position itself near a red ball. The agent can be positioned near the red ball (for example, within one body length from the red ball) and the user can indicate this as a positive example. The agent can be allowed to walk away from the red ball and the user can indicate this as a negative example. Similarly, when the agent is near a yellow ball, the user can indicate this as a negative example. This training can continue until the agent can achieve the goal configuration and can act accordingly when provided the command to be near the red ball.

The positive and negative examples may be provided by various types of interfaces. Such interfaces can include a spoken word by the user identified by the agent via, for example, a microphone. Other interfaces can include mobile device interfaces, such as a wireless connection between the mobile device and the agent, where feedback can be provided to the agent via the mobile device; a positive/negative example button on the device itself; hand gestures; or the like.

In some embodiments, a distance function may be used as an intermediate reward to the agent, where the agent can be trained to recognize they are getting closer to achieving the goal configuration. The agent may be able to convert state features into this distance function and include such data into a goal achievement test. In some embodiments, the distance feedback may be in conflict with the direct feedback from the user. The agent may be programmed to, for example, suppress the distance function when in conflict with the user feedback.

In some embodiments, the agent may track feature categories for each goal configuration. For example, feature categories may include objects, pose, location, and the like. Thus, with the above example, for the goal configuration of "near red ball", the agent would learn that this goal configuration is involved strictly with an object. However, should the user train the agent this goal configuration in a particular room, the agent may provide some weight to the location feature category. Through continual learning, the agent may dissociate the location feature category with the goal configuration of "near red ball" as additional feedback/rewards are provided in other locations.

The feature categories are one example of state features that may be extracted by the agent during goal configuration. When the agent receives positive and negative examples, the agent may observe certain state features, such as room features, object positioning, ambient lighting, ambient sounds, or the like. The agent may look for similarity in these state features from one positive example to another, for example. As more samples are received, the agent may have an increased confidence level with respect to a certain goal configuration. In some embodiments, the agent may not take a certain action until a high enough level of confidence is achieved. In some embodiments, state features can be weighted based on specific types of features.

As mentioned above, the agent may create policies or skills based on one or more learned goal configurations. For example, an agent, such as a robot dog, can be trained the goal configurations of near red ball, near human, pick up red ball and release red ball. From these trained goal configurations, the agent can learn a fetch red ball policy where, through positive and negative examples or rewards, the agent can learn that fetch red ball requires the goal configurations of near red ball, pick up red ball, near human and release red ball in that order.

The agent may be able to practice in order to improve its policy. Practice can include human directed practice and self-practice. The agent, recognizing that it does not have anything more important to do and recognizing that it is in a good initial condition, can choose among of various options to practice. The agent may select its practice based on which policies/skills need the most practice, which is most likely to improve, stochastically, based on how recent the policy was used or practiced, based on the most used skill, based on which may have the most off-policy effects, or the like.

For example, the robot, understanding the goal configuration of "near red ball" may try various action choices to determine if such actions get the agent closer to achieving the goal configuration. If the robot stands on its head, for example, it can determine that it is no closer to achieving the goal configuration. If the robot walks, the robot can determine that may get closer to achieving the goal configuration. Thus, the robot can learn what action choices are relevant to achieving the goal and therefore, bias its action choices accordingly.

Through practice, the agent can update policies based on performance. These updates may include on-policy updates, or updating a policy that they are directly practicing, as well as off-policy updates, or learning to improve one behavior while doing another.

Here, the feature categories, as discussed above, may play a role. For example, in learning the goal configuration of "near red ball", the agent should learn that this is an object-based goal configuration. However, if the agent is trained to make coffee, the location feature category may be important, so that the agent would want to be positioned in the kitchen.

Figure 2:
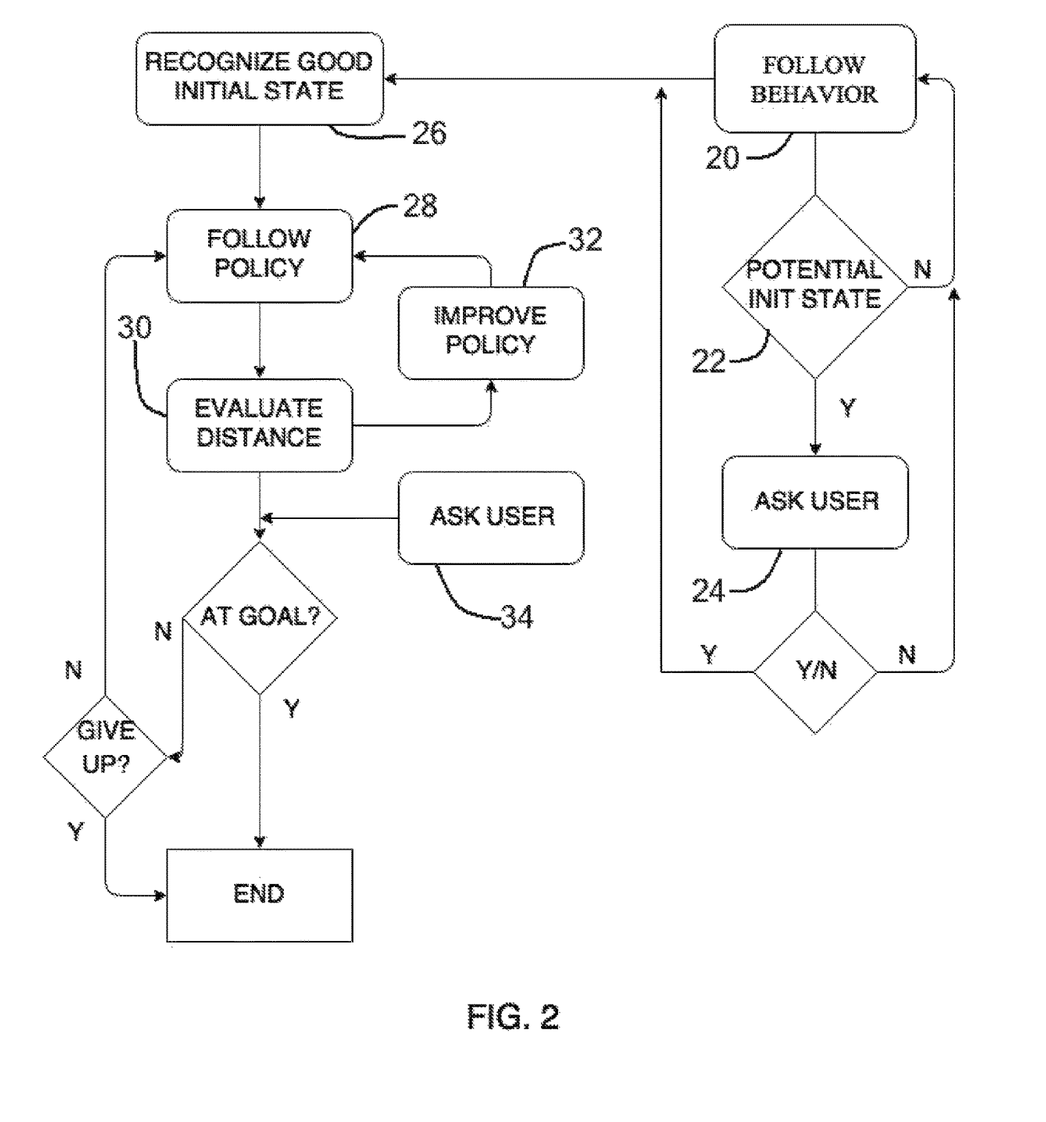
FIG. 2 illustrates an exemplary flow chart showing how an artificial intelligent agent may learn to achieve goal configurations.

Referring now to FIG. 2, as an example, at 20, the agent can be following typical behavior in the world. Should the agent decide, for example, to practice a fetch policy, it needs to determine whether it is in a potential initial state at 22. The agent may optionally ask the user at 24 and may recognize a good initial state at 26. The agent may follow the policy at 28 while evaluating progress via, for example, a distance function at 30. The policy may be improved at 32. If the agent is at its goal, as learned via the goal configuration training described with respect to FIG. 1, it can update the policy as needed and end the practice.

In some embodiments, as shown at 34, the agent may engage in active learning by asking the user/human for assistance. For example, if the agent does not see the red ball and the goal configuration being practiced is "near red ball", the agent may ask the user if the agent is in a goal state to help disambiguate states that are still classified as being on the boundary.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

The particular implementation of the intelligent artificial agents may vary depending upon the particular context or application. By way of example, and not limitation, the intelligent artificial agents described in the foregoing were principally directed to two-dimensional implementations; however, similar techniques may instead be applied to higher-dimension implementation, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

The claims are thus to be understood to include what is specifically illustrated and described above, what is conceptually equivalent, what can be obviously substituted and also what incorporates the essential idea of the invention.

What is claimed is:

1. A method for training an artificial intelligent agent to recognize a goal configuration, comprising:
   placing the agent in the goal configuration and identifying a resulting state as a positive example;
   providing negative examples to the agent that demonstrate the agent in a state failing to achieve the goal configuration;
   extracting key state features when the agent is in the goal configuration, the key state features including at least one of a room feature, object positioning, ambient lighting, and ambient sounds;

determining what feature categories are important in the goal configuration during receipt of positive examples to the agent;

learning and recognizing, by the agent, the goal configuration based on the extracted key state features and the determined important feature categories;

creating policies, by the agent, based on the learned goal configuration;

converting state features into a distance function to determine how far the agent is from the goal configuration;

using goal detection as a final reward; and using a goal distance as an intermediate reward.

2. The method of claim 1, wherein an interface is used to indicate an example as being either the positive example or the negative example, the interface includes at least one of a spoken word received by the agent, an electronic signal received from a computing device, and a physical button on the agent.

3. The method of claim 1, wherein the step of extracting key state features includes looking for similarity in state features in each of the positive and negative examples.

4. The method of claim 3, further comprising increasing a confidence of the agent as the positive and negative examples are received by the agent.

5. The method of claim 4, wherein the agent takes an action upon reaching a predetermined level of confidence.

6. The method of claim 1, wherein the key state features are weighted according to a predetermined weight value.

7. The method of claim 1, further comprising asking, by the agent, for human feedback regarding whether the agent is in a goal state.

8. A system comprising a processor and a computer-usable medium embodying a computer program code, the computer program code comprising instructions executable by the processor and configured to provide a method of learning to recognize a goal configuration of an artificial agent, the method comprising:

placing the agent in the goal configuration and identifying a resulting state as a positive example;

providing negative examples to the agent that demonstrate the agent in a state failing to achieve the goal configuration;

extracting key state features when the agent is in the goal configuration, the key state features including at least one of a room feature, object positioning, ambient lighting, and ambient sounds;

determining what feature categories are important in the goal configuration during receipt of positive examples to the agent;

learning and recognizing, by the agent, the goal configuration based on the extracted key state features and the determined important feature categories;

creating policies, by the agent, based on the learned goal configuration;

converting state features into a distance function to determine how far the agent is from the goal configuration;

using the distance function as an intermediate reward for the agent; and using goal detection as a final reward.

9. The system of claim 8, wherein the method further comprises recognizing whether the agent is in an initialization state.

10. The system of claim 8, wherein the method further comprises self-practice by the agent.

11. The system of claim 10, wherein a selected goal configuration for self-practice is selected based on at least one of a random determination, which goal configuration needs the most improvement, which goal configuration is most likely to improve, which goal configuration has been used least recently, and which goal configuration is most used.

12. The system of claim 10, wherein the method further comprises biasing action choices based on which actions are important to achieving the goal configuration.

13. The system of claim 8, wherein the method further comprises updating a policy for achieving a goal configuration based on performance of the agent.

14. A non-transitory computer-readable storage medium with an executable program stored thereon, wherein the program instructs one or more processors to perform the following steps to cause an agent to recognize and learn a goal configuration:

placing the agent in the goal configuration and identifying a resulting state as a positive example;

providing negative examples to the agent that demonstrate the agent in a state failing to achieve the goal configuration;

extracting key state features when the agent is in the goal configuration, the key state features including at least one of a room feature, object positioning, ambient lighting, and ambient sounds;

determining what feature categories are important in the goal configuration during receipt of positive examples to the agent;

learning and recognizing, by the agent, the goal configuration based on the extracted key state features and the determined important feature categories;

creating policies, by the agent, based on the learned goal configuration;

converting state features into a distance function to determine how far the agent is from the goal configuration;

using the distance function as an intermediate reward for the agent; and using goal detection as a final reward.

15. The non-transitory computer-readable storage medium of claim 14, wherein the step of extracting key state features includes looking for similarity of the key state features in each of the positive and negative examples.

16. The non-transitory computer-readable storage medium of claim 14, wherein the program instructs one or more processors to perform the following steps:

increasing a confidence of the agent as additional ones of the positive and negative examples are received by the agent; and taking an action by the agent upon reaching a predetermined level of confidence.

* * * * *